United States Patent
Michel et al.

(10) Patent No.: US 7,596,572 B1
(45) Date of Patent: Sep. 29, 2009

(54) METHODS AND APPARATUS FOR PROVIDING A CATEGORICAL APPROACH TO VALUETYPE BRIDGE SUPPORT

(75) Inventors: Ruben Michel, Hopkinton, MA (US); Stanislav Sosnovsky, Upton, MA (US); Richard Francis Cormier, Franklin, MA (US); Vitaly Rozenman, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 492 days.

(21) Appl. No.: 11/324,843

(22) Filed: Jan. 3, 2006

(51) Int. Cl.
*G06F 7/00* (2006.01)
*G06F 17/00* (2006.01)
*G06F 15/00* (2006.01)

(52) U.S. Cl. ............... 707/100; 707/103 R; 707/103 Y; 707/103 X; 707/103 Z (58) Field of Classification Search ............... 707/10, 707/102, 104.1; 382/181; 704/10; 706/45–61; 715/205–208, 715–726; 719/313–330
See application file for complete search history.

(56) References Cited

U.S. PATENT DOCUMENTS

| | | | |
|---|---|---|---|
| 6,934,709 B2 * | 8/2005 | Tewksbary | 707/10 |
| 2004/0210585 A1 * | 10/2004 | Tewksbary | 707/10 |
| 2005/0165826 A1 * | 7/2005 | Ho et al. | 707/102 |
| 2005/0262130 A1 * | 11/2005 | Mohan | 707/102 |

* cited by examiner

*Primary Examiner*—Cam Y Truong
*Assistant Examiner*—Cecile Vo
(74) *Attorney, Agent, or Firm*—Chapin IP Law, LLC (57) ABSTRACT

A system provides categorical mapping of valuetypes by receiving, as input, a valuetype within an object model specification. The system applies a categorical-based generator that applies at least one morphism to the object model specification. Application of the categorical-based generator generates an interface that exposes the valuetype in an interface object model and generates an implementation of the interface that exposes the valuetype in a middleware implementation object model. The interface and its implementation seamlessly support valuetype properties including inheritance, null values, native casting and arbitrary graph communication.

15 Claims, 4 Drawing Sheets

PRIOR ART

FIG. 1

PRIOR ART

METHODS AND APPARATUS FOR PROVIDING A CATEGORICAL APPROACH TO VALUETYPE BRIDGE SUPPORT

BACKGROUND

Modern computer software applications are often distributed between computer systems and require ability to access and exchange information with other remotely operating software applications. Such exchanges of data and access to functionality often take place over a computer network such as a local area network or a wide area network such as the Internet. Due to the complexities and varying mechanisms of implementing functionality and data formats within modern software applications, software developers often employ software commonly referred to as "middleware" that provides a standardized mechanism for the exchange of information and access to functionality between two or more remotely operating software programs. Middleware is generally connectivity software that consists of a set of enabling services that allow multiple processes running on one or more machines to interact across a network.

Middleware allows a software developer to create a software application using calls to a middleware-specific application programming interface or API in order to insulate the software developer from having to know the details of how to access the remotely operating software application and associated remote data structures or objects. By incorporating a set of middleware-specific function calls into the application under development, the software developer relies on the middleware transport and data access mechanisms and does not need to be concerned with details such as creation of connections to remote computer systems. Middleware is thus software that connects otherwise separate applications or separate products and serves as the glue between the applications. Middleware is thus distinct from import and export features that may be built into one of the applications. Developers often refer to middleware "plumbing" because it connects two sides of an application and passes data between them. For example, there are a number of middleware products that link a database system to a web server. This allows a user application to request data from the database using forms displayed on a web browser, and it enables the web server to return dynamic web pages based on the user application's requests.

One example of commonly used middleware architecture is called CORBA. CORBA is an acronym for Common Object Request Broker Architecture. The CORBA environment is an industry standard that is maintain by Object Management Group, Inc. (OMG) of Needham, Mass., USA. As described on OMG's web site, CORBA provides a vendor-independent architecture and infrastructure that computer applications use to work together over data networks. Using standardized protocols, a CORBA-based program from any vendor, on almost any computer, operating system, programming language, and network, can interoperate with a CORBA-based program from the same or another vendor, on almost any other computer, operating system, programming language, and network.

Conventional CORBA applications are composed of objects that are individual units of running software that combine functionality and data. Typically, there are many instances of an object of a single type. For example, an e-commerce website would have many shopping cart object instances, all identical in functionality but differing in that each is assigned to a different customer (i.e., client browser), and each contains data representing the merchandise that its particular customer has selected. For other object types, there may be only one instance. As an example, when a legacy application, such as an accounting system, is wrapped in code with CORBA interfaces and opened up to clients on a network, there is usually only one instance.

For each object type, such as the shopping cart mentioned above, a developer using middleware such as CORBA defines an interface in an OMG Interface Description Language (IDL). The interface is a syntax part of a contract that a server object offers to client programs that invoke functionality and access data within that server object. Any client that wants to invoke an operation on the object must use this IDL interface specification (i.e., object specification) to specify the operation it wants to perform, and to marshal arguments (i.e., parameters or data) that the client sends and receives from the server for access to that object. When the invocation reaches the target object, the same interface definition is used there to unmarshal the arguments so that the object can perform the requested data processing operation with the arguments. The interface definition is then used to marshal the results for their trip back to the client, and to unmarshal them when they reach the client destination.

A conventional IDL interface definition is independent of a selected programming language, but maps to all of the popular programming languages via industry standards. As an example, there are standardized mappings from IDL to C, C++, Java, COBOL and other languages.

The use of a middleware-specific interface, such as a CORBA call, that is separate from the middleware implementation, enabled by the IDL, is one essence of middleware such as CORBA and explains how conventional middleware enables interoperability between applications with all of the above noted transparencies. The interface to each object using a conventional middleware platform is defined very strictly. However, CORBA and other middleware platforms hide the implementation of an object (i.e., its running code and its data) from the rest of the system (that is, middleware encapsulates the implementation) behind a boundary that the client application may not cross. Clients access objects only through their advertised CORBA (or other middleware-specific) interface, invoking only those CORBA (or other middleware) operations that the object exposes through its IDL interface, with only those CORBA (or other middleware) parameters (input and output) that are included in the invocation.

Figure 1:
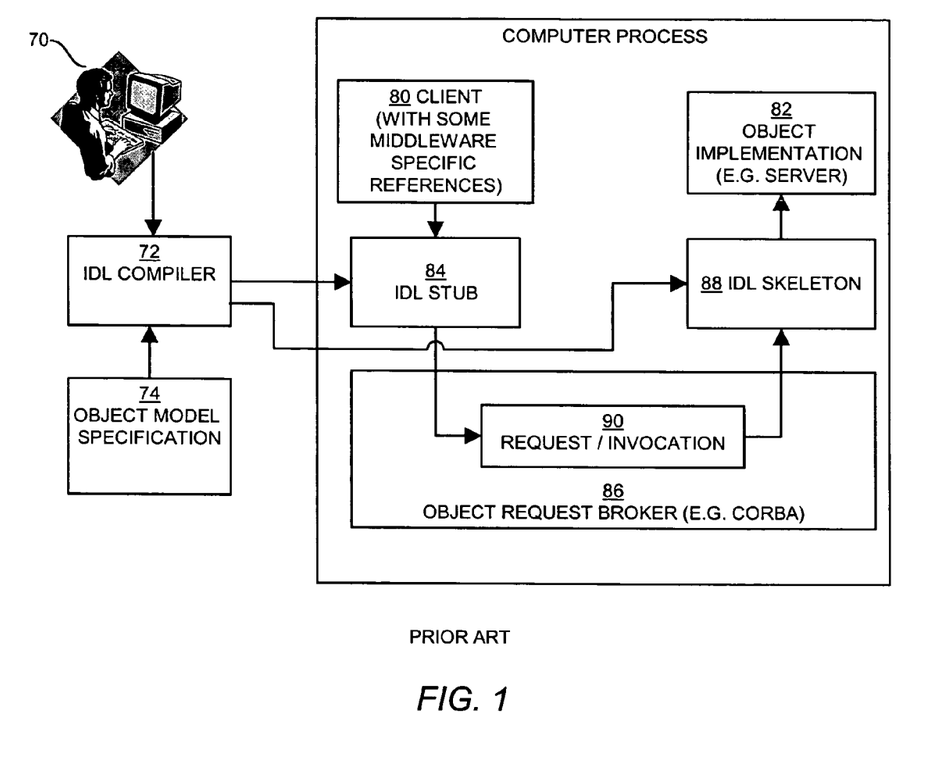
FIGS. 1 and 2 are prior art illustrations of operations of conventional middleware.

FIG. 1 is a prior art illustration of an invocation 90 by a single client process 80 for access to an object implementation 82 using middleware such as CORBA including an IDL stub 84, an object request broker 86, and an IDL skeleton 88. While the instant example uses CORBA as the middleware platform, the example applies to other conventional middleware platforms as well.

Prior to execution, a developer 70 using an IDL compiler 72 compiles an object model specification 74 defined in IDL into client IDL stubs 84 and object skeletons 88, and writes the code for the client 80 and for the object implementation 82. The stubs 84 and skeletons 88 serve as proxies for clients 80 and object 82 (e.g., server), respectively. Because IDL defines interfaces so strictly, the stub 84 on the client side has no trouble meshing perfectly with the skeleton 88 on the server side, even if the two are compiled into different programming languages. If CORBA is the middleware that provides the object request broker (ORB) 86, the CORBA ORB 86 can even be produced from different vendors so long as it conforms to the CORBA standard.

In CORBA, every object instance 82 has its own object reference in the form of an identifying electronic token or string. Clients 80 use the object references to direct their invocations 90, identifying to the ORB 86 the exact instance of an object 82 that the client 80 wants to invoke. Using the shopping cart example, this ensures that the shopping cart object 82 for one client 80 is different from a shopping cart object of another client. The client 80 acts as if it is invoking an operation on the object instance 82, but the client 80 is actually invoking a call on the IDL stub 84 that acts as a proxy to the object 82. Passing through the stub 84 on the client side, the invocation 90 continues through the ORB 86, and the skeleton 88 on the implementation side, to get to the object implementation 82 where it is executed. FIG. 1 thus shows invocation through a single machine.

Figure 2:
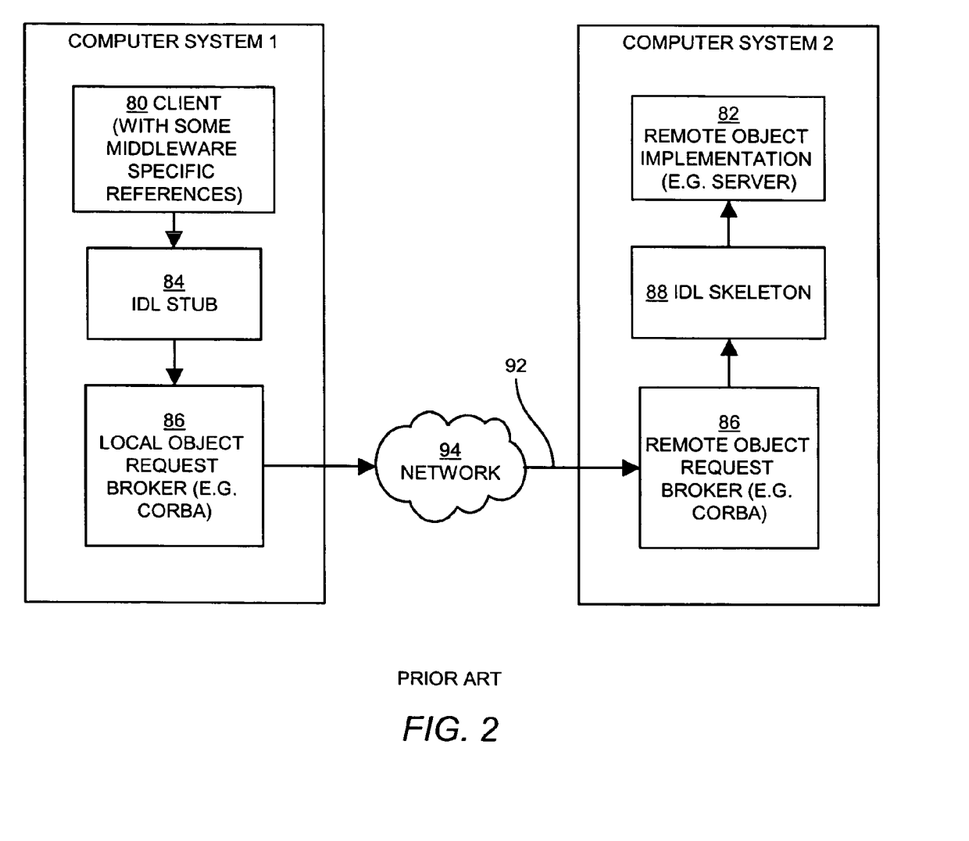

FIG. 2 diagrams a remote invocation 92 that occurs over a network. In order to invoke the remote object instance 94, the client 80 first obtains its object reference using a naming or trading service. To make the remote invocation 92, the client 80 uses the same code used in the local invocation described in FIG. 1, but substitutes the object reference for the remote object instance 94. When the local ORB 86 examines the object reference and discovers that the target object 94 is a remote object, the local ORB 86 routes the invocation 92 out over a network 94 to the remote object's ORB 96.

To identify the correct object 94, the client 80 knows the type of object 94 that it is invoking (e.g., that it's a shopping cart object), and the client stub 84 and object skeleton 88 are generated from the same IDL object model specification 74. This means that the client 80 knows exactly which operations it may invoke, what the input parameters are, and where they have to go in the invocation. Accordingly, when the invocation 92 reaches the target object 94, all parameters are present. Additionally, the local client's 80 ORB 86 and the remote object's ORB 96 operate on a common protocol that provides a representation to specify the identity of the target object 94, its operation, and all parameters (input and output) of every type that they may use. Accordingly, although the local ORB 86 can tell from the object reference that the target object 94 is a remote object, the client 80 does not know the physical operating location of the target object 94. There is nothing in the object reference token obtained by the client 80 that the client holds and uses at invocation time that identifies the location of the target object 94. The token is opaque to the client. This ensures location transparency in order to simplify the design of distributed object computing applications.

Another example of middleware development environments are COM (Common Object Model) and DCOM (Distributed COM) developed by Microsoft Corporation of Redmond, Wash., USA. COM refers to both a specification and implementation developed by Microsoft Corporation which provides a framework for integrating components. This framework supports interoperability and reusability of distributed objects by allowing developers to build systems by assembling reusable components from different vendors which communicate via COM in a manner similar to that of the CORBA example provided above. By applying conventional COM to build systems of preexisting components, developers attempt to reap benefits of maintainability and adaptability. COM defines an application programming interface (API) to allow for the creation of components for use in integrating custom applications or to allow diverse components to interact.

However, in order to interact, COM components must adhere to a binary structure specified by Microsoft Corporation. As long as COM components adhere to this binary structure, components written in different languages can interoperate using COM on the Windows platform only. Distributed COM is an extension to COM that allows network-based component interaction. While COM processes can run on the same machine but in different address spaces, the DCOM extension allows processes to be spread across a network. With DCOM, components operating on a variety of other platforms can interact, as long as DCOM is available on those other platforms.

Another technology related to middleware and the use of object-oriented programming is referred to as a bridge design pattern. A bridge design pattern bridges two object models, typically an abstraction and its implementation. The bridge design pattern is described more fully in a book entitled "Design Patterns—Elements of Reusable Object-Oriented Software" authored by Erich Gamma, Richard Helm, Ralph Johnson, and John Vlissides (ISBN 0-201-63361-2), published by Addison Wesley Publishing Company, 2000. The entire teachings and contents of this reference are hereby incorporated by reference in their entirety.

SUMMARY

Conventional mechanisms and techniques used for developing software applications that rely on middleware environments suffer from a variety of deficiencies. In particular, when a software developer produces an object model specification using an interface description language (IDL) and compiles this object model specification using a conventional middleware compiler such as a conventional CORBA IDL compiler, the conventional stubs 84 (FIG. 1) and skeletons 88 (FIG. 1) and any functionality exposed through the CORBA stubs or skeletons requires sophisticated knowledge of the IDL and its specific language mappings (to Java, C++, etc). Application programmers responsible for developing client 80 application code, who often lack this knowledge of middleware specific information, are often slowed down in their development efforts by the middleware-specific information produced within the generated IDL stubs 84 and IDL skeletons 88. Programmers can thus become significantly more productive if they program using CORBA-independent stubs and skeletons.

As a specific example, a CORBA interface typically consists of many IDL "types" including the interface itself, one or more super interfaces, enums, exceptions, sequences, structs, valuetypes, methods with parameters and return types, and so forth. When presented with an IDL interface object model specification 74, a conventional IDL-to-Java compiler emits the conventional IDL object model (stubs 84 and skeletons 88 in FIG. 1 above), which are realized by a plethora of Java classes and Java interfaces, each conforming to the IDL-to-Java mapping. While this object model is ORB-vendor independent, unfortunately, the conventionally emitted files are cluttered with middleware-specific (i.e., CORBA) information, such as CORBA markers, interface-repository information, references to the CORBA ORB and its methods, methods invoked by the CORBA ORB, marshalling functionality, and the like. Such middleware-specific information is often distracting and confusing to application development programmers unfamiliar with CORBA. As a result, the programmers who must utilize the stubs and skeletons must become familiar to some extent with middleware-specific information presented within the interface stubs 84 and skeletons 88. The programmers are thus less efficient. The programmers can become significantly more productive if they program using CORBA-independent stubs and skeletons, but conventional middleware development platforms do not provide such capability.

Additionally, in the event that an owner of software desires to change the middleware system, for example, from CORBA to a middleware system such as COM, the application software that relies on the middleware system must be revised so that the middleware-specific references utilized within the IDL stubs and skeletons comply with the new selected middleware environments. Accordingly, initial selection of a conventional middleware environment can become an important decision when creating software using conventional middleware development techniques due to the future difficulty of switching to a different middleware platform after the software has been developed using a chosen middleware platform. As new middleware platforms enter the marketplace and/or as existing platforms are equipped with more features (or client application requirements change), dependence upon a specific middleware platform can become problematic.

One solution to this problem is described in detail in co-pending patent application entitled "METHODS AND APPARATUS FOR CREATING MIDDLEWARE INDEPENDENT SOFTWARE" filed Mar. 31, 2005, having U.S. Ser. No. 11/095,406, sharing co-inventorship herewith, and assigned to the same assignee as the present invention. The entire teachings and contents of this referenced patent application are hereby incorporated by reference in their entirety. The solution described in the above-referenced patent application applies for many different IDL types, such as interface, enum, struct, exception, and sequence used within object oriented programming languages such as Java.

Technology related to producing or generating code using a categorical approach is described in co-pending patent application entitled "SYSTEM AND METHODS FOR GENERATING A SOFTWARE COMPONENT INTERFACE" filed Jun. 24, 2005, having U.S. Ser. No. 11/166,934, sharing co-inventorship herewith, and assigned to the same assignee as the present invention. The entire teachings and contents of this referenced patent application are hereby incorporated by reference in their entirety.

Another construct used in the development of software is a valuetype. Valuetypes are a late arrival into IDL. Their introduction was driven by the spectacular emergence of the Java programming language in general and the J2EE servers in particular. As a result, conventional use of valuetypes in their full generality lack the precise lucidity of earlier IDL types, such as interface, enum, struct, exception, and sequence. The inconsistency and resulting weakness of the valuetype design becomes apparent when contrasting the support of conventional valuetype members with that of conventional valuetype factories and methods. Whereas valuetype members are passed, obviously, by value, factories and methods must be implemented separately by the client and the server. If a conventional client and the server impart different semantics to their respective implementations of factories and methods, a rather catastrophic miscommunication may ensue. Consequently, versioning is difficult when supporting conventional use of valuetype factories and methods.

The invention and system disclosed herein is based in part on the observation that valuetype factories and methods should not be supported at all for versioned component development. Furthermore, since members with private visibility can only be exposed through public methods, private members should not be supported either. Finally, abstract valuetypes, which only support factories and methods, should not be supported altogether.

Despite these restrictions, valuetypes do support useful features. In particular, useful features of valuetypes include:

1. Inheritance (of a single valuetype).
2. Null values.
3. Casting using Java syntax.
4. Arbitrary graph communication.

Embodiments of the invention include a software development system that significantly overcomes the aforementioned deficiencies and provides a system, mechanisms and techniques that apply a categorical approach to the problem of mapping valuetypes. As an example, given an object model, specified in for example an Interface Description Language (IDL), the system disclosed herein generates an abstraction of that object model that preserves the application semantics expressed in the IDL, but that is middleware (e.g. CORBA) independent. In addition, the system explained herein generates an implementation of that abstraction for a particular middleware such as CORBA or another selected middleware platform. As a specific example, if the system disclosed herein receives, as input, a CORBA interface defined in IDL, the system operates as explained herein to output an abstracted, CORBA-independent, object model that exposes the functionality of the CORBA interface and also outputs an implementation of that object model using CORBA but that is hidden from the application developer.

More specifically, the system disclosed herein provides for the categorical mapping of valuetypes to preserve the innate valuetype features of inheritance (of a single valuetype), null values, casting using Java syntax and arbitrary graph communication. As described herein, all these valuetypes features are mapped seamlessly.

In one configuration, the system disclosed herein provides categorical-based generator that provides for categorical mapping of valuetypes. The system receives, as input, an adequately restricted IDL valuetype within an object model specification. In response, the system applies the categorical-based generator that applies at least one morphism to the object model specification. Application of the categorical-based generator generates an interface (such as a Java interface) exposing the valuetype in the interface object model (i.e., an abstracted interface object model). In addition, the system generates an implementation of the interface (the Java interface) that exposes the valuetype in a middleware (e.g., CORBA) implementation object model (i.e. the implementation of the abstraction interface object model). Generally, in one configuration the categorical-based generator performs categorical mapping of the valuetype so that a generated combination of the interface that exposes the valuetype in an interface object model and the implementation of the interface in a middleware implementation object model seamlessly support valuetype properties including inheritance, null values, native casting and arbitrary graph communication.

Using CORBA as an example middleware platform, generation of the abstraction interface object model (i.e., an abstracted interface object model) conceals all the CORBA-related information, while preserving application functionality, while generation of the implementation of the abstraction interface object model produces a CORBA or other middleware implementation object model that implements the interfaces and abstract classes in the interface object model using CORBA, but that is hidden from the programmer developing an application. In this manner, a software developer can obtain the benefits of middleware such as CORBA without having to have knowledge of CORBA and without having interface calls cluttered with CORBA specific information.

Other embodiments include computerized devices, such computer systems, workstations or other devices configured or operable to process and perform all of the method and processing operations disclosed herein as embodiments of the invention. In such embodiments, a computer system includes a memory system, a processor, a communications interface and optionally a display and an interconnection mechanism such as a bus, circuitry or a motherboard connecting these components. The memory system is encoded with a generator application (i.e. a categorical-based generator) that when performed on the processor, produces a generator process that operates as explained herein to perform all of the method embodiments and operations explained herein.

Other arrangements of embodiments of the invention that are disclosed herein include software programs to perform the method embodiment steps and operations summarized above and disclosed in detail below of the categorical-based generator.

More particularly, a computer program product is disclosed that has a computer-readable storage medium including categorical-based generator computer program logic encoded thereon that when performed in a computerized device provides operations of the categorical-based generator application and categorical-based generator process as respectively explained herein. The computer program logic, when executed on at least one processor with a computing system, causes the processor to perform the operations (e.g., the methods) indicated herein as provided by the categorical-based generator. In addition, the abstracted and implementation object models explained herein when encoded on a computer readable storage medium represent embodiments of the invention as well. Such arrangements of the invention are typically provided as software, code and/or other data structures arranged or encoded on a computer readable storage medium such as an optical storage medium (e.g., CD-ROM), floppy or hard disk or other storage medium such as ROM or RAM or PROM chips. Downloadable software images are in one or more modules, shared libraries, etc. The software (source code and/or object code) or firmware or other such configurations can be installed onto a computerized device to cause one or more processors in the computerized device to perform the techniques explained herein as embodiments of the invention. Software processes that operate in a collection of computerized devices, such as in a group of storage area network management servers, hosts or other software development entities are also categorical-based generators when configured as explained herein. The system of the invention can be distributed between many software processes on several computers, or processes such as the categorical-based generator process can execute on a dedicated computer alone. The categorical-based generator (also generally referred to herein as simply the generator) may be integrated into a storage area network management application as well, or used in development of any type of distributed software.

It is to be understood that the system of the invention can be embodied strictly as a software program, as software and hardware, or as hardware alone. Example embodiments of the invention may be implemented within EMC Corporation's software application(s) that provide management functionality for storage area network resources and in computerized devices that operate, for example, ControlCenter software. ControlCenter is a trademark owned by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Embodiments of the invention are able to receive an object model, specified for example in an Interface Description Language (IDL), and are able to generate an abstraction of that object model that preserves the application semantics expressed in the IDL, but that is middleware independent. In addition, the system explained herein generates an implementation of that abstraction for a particular middleware such as CORBA or another selected middleware platform.

Using CORBA as an example, one purpose of the abstracted interface object model is to conceal all the CORBA (i.e., middleware) related information, while preserving application functionality. One purpose of the CORBA-implementation object model is to implement the interfaces and abstract classes in the interface object model using CORBA. To do so, the system disclosed herein provides a categorical-based generator (also referred to as a generator). Through application of morphisms to the object model specification, the system conceals all middleware-related information, while preserving application functionality of an application that uses the object model specification and valuetypes in particular.

Example discussions of embodiments disclosed herein use CORBA as a middleware platform for ease of discussion of processing. However, it is to be understood that the system disclosed herein is not limited to CORBA and that other implementation object models could also be emitted, based on various middleware technologies such as RMI, Tibco, or COM. Furthermore, a no-middleware object model could be emitted for a configuration that uses collocation.

It is also to be understood that the invention is not limited to receiving an object model specification in IDL. IDL is used in the examples herein since it is language and platform neutral. In other words, IDL was chosen because it is platform- and language-neutral, not due to its CORBA origins.

Figure 3:
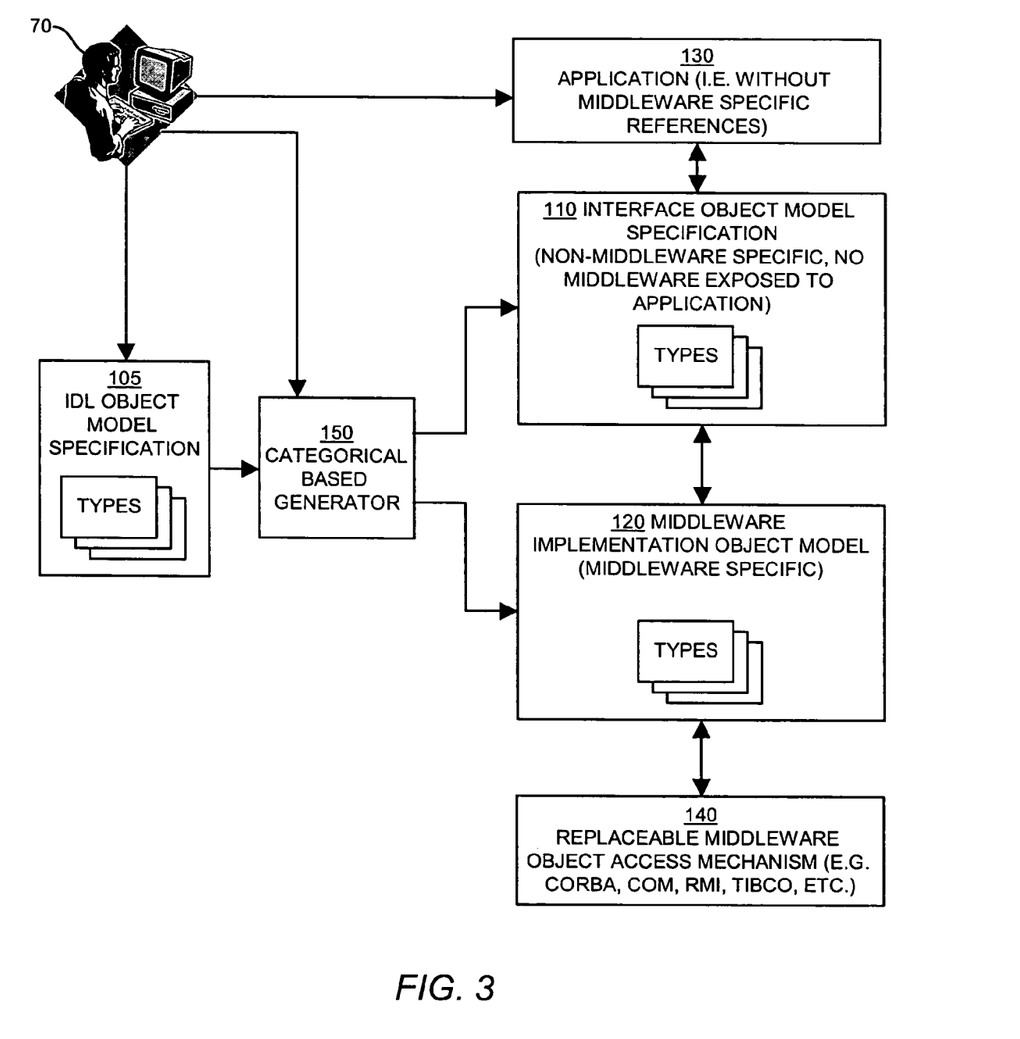
FIG. 3 illustrates an example software generation environment that operates according to embodiments disclosed herein.

FIG. 3 illustrates an application development environment 100 suitable for use in explaining example embodiments of the system disclosed herein. The system disclosed herein allows a developer 70 to provide an IDL object model 105 that includes valuetypes (shown as TYPES in FIG. 3) as input to a categorical-based generator 150 configured in accordance with embodiments of the invention. A categorical-based generator 150 examines each type defined in the IDL object model 105 and produces, as output, an abstraction interface object model 110 that is an abstraction of the IDL object model specification 105 that can be utilized by the developer 101 when creating the application 130, but that hides any middleware related information. Additionally, the categorical-based generator 150 (hereinafter the generator 150) produces an implementation 120 of the abstraction interface object model for a particular middleware object access mechanism 140 used to access data within objects corresponding to the object model specification 105. Since the system disclosed herein describes application of this process as it relates to valuetypes, the remaining discussion will relate to application of the generator to valuetypes.

Figure 4:
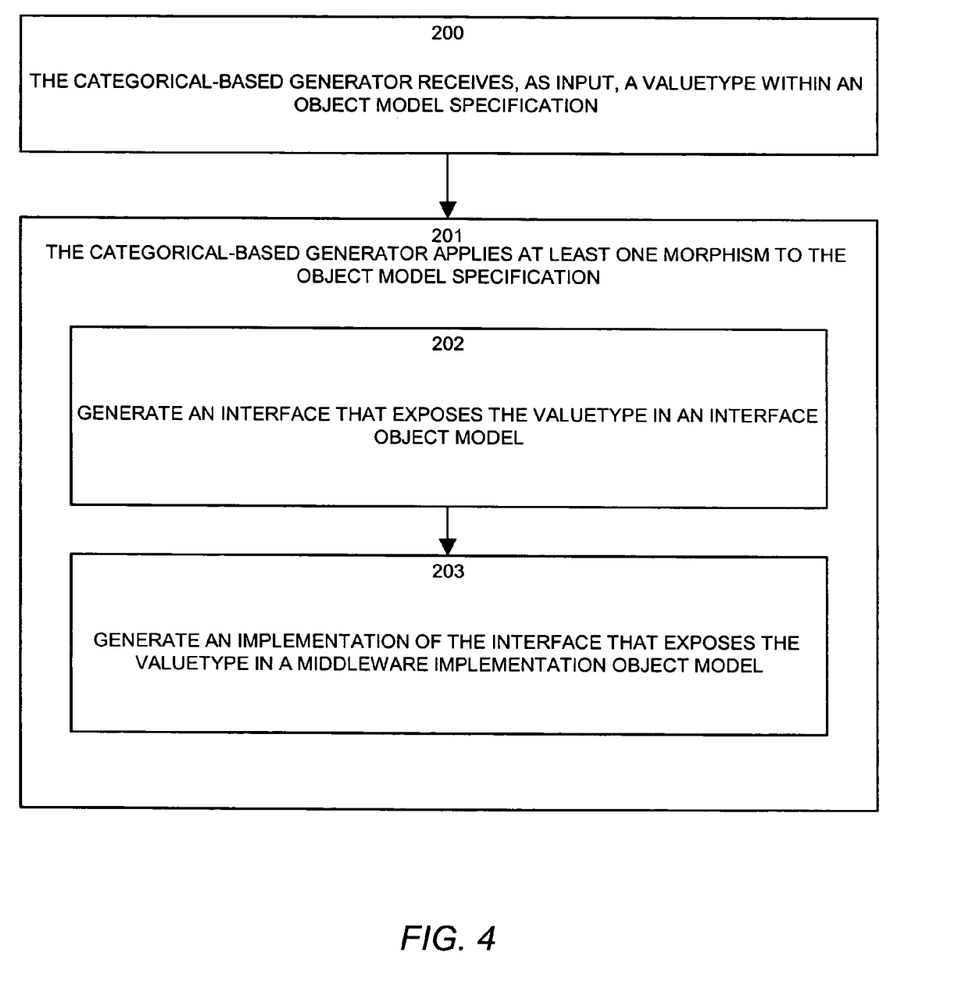
FIG. 4 is a flow chart of processing steps performed by a categorical-based generator as disclosed herein.

FIG. 4 is a flow chart of processing steps performed by a categorical-based generator 150 (i.e. a generator according to embodiments disclosed herein).

In step 200, the categorical-based generator 150 receives, as input, a valuetype 151 within an object model specification 105.

In step 201, the categorical-based generator 150 applies at least one morphism (shown in code examples below) to the object model specification 105.

In step 202, application of the categorical-based generator 150 includes generating an interface that exposes the valuetype in an interface object model.

In step 203, application of the categorical-based generator 150 includes generating an implementation of the interface that exposes the valuetype in a middleware implementation object model.

In this manner, the system disclosed herein is able to process valuetypes 151. Further details of this processing will now be explained with respect to code examples that illustrate further enabling aspects of the invention.

Example 1 below shows an example valuetype hierarchy.

Example 1 Above

The Valuetype IDL Hierarchy

In the above example, the valuetype Review inherits from the valuetype BaseReview. Review has two public attributes: reviewers of type sequence of Reviewer and a recursive attribute additionalReview of type Review; thus, a review contains an arbitrarily long and potentially cyclic sequence of additional reviews. BaseReview has a single public attribute rank of type Rank.

In a code example, the valuetype hierarchy is simulated in the interface object model as follows:

```
package com.emc.eccapi.bridge.book;
/*
 * Generated interface for the IDL valuetype
 * com.emc.eccapi.book.Review.
 */
public interface IReview extends
    com.emc.eccapi.bridge.book.IBaseReview
{
...
}
```

Example 2 Above

Example of the Valuetype Hierarchy Reflected in the Interface Object Model

Following other IDL types, the implementation of valuetypes hinges on delegation as shown in the example below:

```
package com.emc.eccapi.bridge.book;
/*
 * Generated implementation for the IDL valuetype
 * com.emc.eccapi.book.Review.
 */
public class ReviewImpl_
    implements com.emc.eccapi.bridge.book.IReview
{
    public ReviewImpl_( ) {
    this.delegate = new com.emc.eccapi.book.ReviewImpl( );
}
...
private com.emc.eccapi.book.ReviewImpl hh( )
{
    return this.delegate; }
public java.lang.object _h( )
{
    return this.hh( );
}
    private final com.emc.eccapi.book.ReviewImpl delegate;
}
```

Example 3 Above

Valuetype Implementation Through Delegation

In the above example, the class Reviewinpl_, in the CORBA-implementation object model, delegates to the CORBA middleware through the private member delegate, whose type extends the corresponding CORBA valuetype; this delegation scheme is accomplished within the class through the private, strongly-typed morphism hh ( ), and throughout the interface object model through the public, weakly-typed morphism _h ( ).

Unlike other IDL types, which delegate to the corresponding CORBA type directly, valuetypes delegate to a generated implementation class:

```
package com.emc.eccapi.book;
public class ReviewImpl
    extends com.emc.eccapi.book.Review
{
}
```

Example 4 Above

The Class of the Delegate

In the above example, the delegate exploits the following JacORB-specific feature: if the implementation class of the abstract class Review is named ReviewImpl and resides in the same package as Review, a valuetype factory is unnecessary. A Java package defines a namespace for enhanced accessibility among types, and is defined by the package declaration appearing at the head of the file, (e.g., package com.emc.eccapi.book in the above example)

Consequently, the generated ReviewImpl significantly simplifies the usage of Review. Notice that although ReviewImpl directly extends Review and indirectly BaseReview, it does not extend BaseReviewImpl. This is due to a Java limitation, where a class can extend no more than one other class.

Unlike the other IDL types, which can never assume a null value, valuetypes can be null. To accommodate this valuable feature, the following example methods are supplied by a system configured in accordance with the invention:

package com.emc.eccapi.bridge.book;

public class ReviewImpl_
    implements com.emc.eccapi.bridge.book.IReview

{

. . .

public static com.emc.eccapi.book.Review
    h(com.emc.eccapi.bridge.book.IReview bridge)
    {
    if (bridge == null) return null;
    return (com.emc.eccapi.book.Review) bridge._h( );
    }
    public static com.emc.eccapi.bridge.book.IReview
    hInv(com.emc.eccapi.book.Review delegate)
    if (delegate == null) return null;
    return (com.emc.eccapi.bridge.book.IReview)
        com.emc.eccapi.framework.valuetypeBridgeFactory.
        createBridge(delegate);
    }
. . .

}

Example 5 Above

The Handling of Null Valuetypes

In the above example code, the morphism _h (, defined in Example 3 above, should never be directly applied to an interface object model object, since it could be null. Instead, the null checking method h ( ) is invoked, which checks for null value before safely applying the morphism _h ( ). The inverse morphism is accorded the same treatment. Therefore, null values incur no overhead.

Applying the inverse morphism, hInv ( ), is significantly more involved, since its actual parameter type is unknown: the delegate parameter could be either a Review or any type derived from Review. The goal here is simple: an application-level cast, i.e., a cast of an interface object model object, should use a plain Java-syntax cast. Casting can take place in the application code, which is not shown here. For example, a CORBA method could return a BaseReview instance, which the application code would then downcast to a Review instance. Therefore, the type of the CORBA-implementation object model that is created in hinv ( ) must correspond to the actual type of the delegate.

This is accomplished with a runtime use of Java reflection as shown below:

```
package com.emc.eccapi.framework;
import java.lang.reflect.Constructor;
public class ValuetypeBridgeFactory
{
    private final static String ECCAPI_PACKAGE = "com.emc.eccapi";
    private final static String ECCAPI_BRIDGE_PACKAGE =
            ValuetypeBridgeFactory.ECCAPI_PACKAGE + ".bridge";
    private final static String BRIDGE_SUFFIX = "_";
    // Create the bridge of the delegate's real type.
    public static Object createBridge (Object delegate)
    {
        // Get the delegate's Impl class.
        Class delegateImplClass = delegate.getClass( );
        // Get the delegate's Impl class name.
        String delegateImplClassName = delegateImplClass.getName( );
        // Get the corresponding bridge type.
        Class delegateBridgeClass =
            ValuetypeBridgeFactory.getBridgeClass(
                            delegateImplClassName
                                    );
        try
        {
            // Get the constructor.
            Constructor c = delegateBridgeClass.getDeclaredConstructor(
                                    new Class[ ] {delegateImplClass}
                                            );
            // Create the instance, passing the delegate.
            Object o = c.newInstance(new Object[ ] {delegate});
            return o;
        }
        catch (Throwable e)
        {
            throw new FatalError(...);
        }
    }
    // Get the delegate's bridge type.
    static private Class getBridgeClass(String delegateImplClassName)
    {
        // Translate to bridge package.
        String delegateBridgeClassName =
            ValuetypeBridgeFactory.ECCAPI_BRIDGE_PACKAGE
            + delegateImplClassName.substring(
                    ValuetypeBridgeFactory.ECCAPI_PACKAGE.length( )
                            )
            + ValuetypeBridgeFactory. BRIDGE_SUFFIX;
        // Load the bridge class.
        try
        {
            return Class.forName(delegateBridgeClassName);
        }
        catch (Throwable e)
        {
            throw new FatalError(...);
        }
    }
}
```

Example 6 Above

Evaluating the Inverse Morphism

In the above example, the createBridge ( ) method (i.e., a bridge creation method) first obtains the type of the delegate. Next, it invokes the getBridgeClass ( ) method (i.e. a bridge synthesis method) to synthesize, using Java reflection (e.g., a reflection technique), the corresponding bridge type, i.e., the corresponding type in the CORBA (i.e., middleware)-implementation object model. Finally, it constructs an instance of the bridge type, which wraps the given delegate.

A severe limitation of recursive IDL structs is their inability to communicate arbitrary graphs. This limitation is fully resolved by recursive valuetypes. When such an arbitrary graph that uses recursive valuetypes is transmitted, the application programmer occasionally needs to determine whether two nodes in the graph are identical. An elegant feature of the Java mapping of IDL is that node equivalence can be determined using operator ==. Unfortunately, Java does not support operator overloading; thus, a different syntax must be used in the interface object model: the equals ( ) method (an equivalence method).

```
package com.emc.eccapi.bridge.book;
public class ReviewImpl_
        implements com.emc.eccapi.bridge.book.IReview
{
    ...
    public boolean equals(java.lang.Object otherObject)
    {
        if (this == otherObject) return true;
        if (otherObject == null) return false;
        if (this.getClass( ) != otherObject.getclass( )) return false;
        com.emc.eccapi.bridge.book.ReviewImpl_ other =
                (com.emc.eccapi.bridge.book.ReviewImpl_) otherObject;
        return this.___h( ) == other.___h( );
    }
    public int hashCode( )
    {
        return this.___h( ).hashCode( );
    }
    ...
}
```

Example 7 Above

Node Equivalence in the Interface Object Model

The following explains how the equals ( ) method, introduced in Example 7 above, operates. After verifying that the two objects under comparison are non null and of the same type, the equals ( ) method simply delegates to operator == on the underlying valuetypes by applying the morphism _h ( ). Since the equals ( ) method is overridden, the hashCode ( ) method must be correspondingly overridden.

Finally, each attribute of every valuetype on the inheritance hierarchy is mapped to a public getter and setter; thus, accessing attributes involves no copying.

```
package com.emc.eccapi.bridge.book;
public class ReviewImpl_
        implements com.emc.eccapi.bridge.book.IReview
{
    ...
    public com.emc.eccapi.bridge.book.IReviewer[ ]
    ___getReviewers( )
    {
        return h1Inv(hh( ).reviewers);
    }
    public void
    ___setReviewers(com.emc.eccapi.bridge.book.IReviewer[ ] reviewers)
    {
        hh( ).reviewers = h1(reviewers);
    }
    public com.emc.eccapi.bridge.book.IReview
    ___getAdditionalReview( )
    {
        return com.emc.eccapi.bridge.book.ReviewImpl.hInv(
                hh( ).additionalReview
                                  );
    }
```
-continued
```
    public void
    ___setAdditionalReview(
            com.emc.eccapi.bridge.book.IReview additionalReview
                          )
    {
        hh( ).additionalReview =
            com.emc.eccapi.bridge.book.ReviewImpl_.h(
                                additionalReview
                                                 );
    }
    public com.emc.eccapi.bridge.book.IRank
    ___getBookRank( )
    {
        return
        com.emc.eccapi.bridge.book.RankImpl_.hInv(hh( ).bookRank);
    }
    public void
    ___setBookRank(com.emc.eccapi.bridge.book.IRank bookRank)
    {
        hh( ).bookRank =
            com.emc.eccapi.bridge.book.RankImpl_.h(bookRank);
    }
    static private com.emc.eccapi.book.Reviewer [ ]
    h1(com.emc.eccapi.bridge.book.IReviewer[ ] reviewer_Bridge)
    {
        if (reviewer_Bridge == null) return null;
        int numberOfElements = reviewer_Bridge.length;
        com.emc.eccapi.book.Reviewer[ ] reviewer_Corba =
                new com.emc.eccapi.book.Reviewer[numberOfElements];
        for (int iReviewer = 0; iReviewer < numberOfElements; ++iReviewer)
        {
            reviewer_Corba[iReviewer] =
                com.emc.eccapi.bridge.book.ReviewerImpl_.h(
                                reviewer_Bridge[iReviewer]
                                                 );
        }
        return reviewer_Corba;
    }
    static private com.emc.eccapi.bridge.book.IReviewer[ ]
    h1Inv(com.emc.eccapi.book.Reviewer[ ] reviewer_Corba)
    {
        if (reviewer_Corba == null) return null;
        int numberOfElements = reviewer_Corba.length;
        com.emc.eccapi.bridge.book.IReviewer[ ] reviewer_Bridge =
                new com.emc.eccapi.bridge.book.IReviewer[numberOfElements];
        for (int iReviewer = 0; iReviewer < numberOfElements; ++iReviewer)
        {
            reviewer_Bridge[iReviewer] =
                com.emc.eccapi.bridge.book.ReviewerImpl_.hInv(
                                reviewer_Corba[iReviewer]
                                                 );
        }
        return reviewer Bridge;
    }
    ...
}
```

Example 8 Above

Mapping Attributes

Specifically, from the above example, in the valuetype hierarchy of Example 1, the Review valuetype features two public attributes: additionalReview and reviewers. Review inherits from the BaseReview valuetype, which features the single public attribute bookRank. As indicated in Example 8, the class ReviewImpl_defines both a getter and a setter for each of these three attributes, which delegate through the morphisms to CORBA. Notice that one-dimensional sequences are mapped with the generated one-dimensional morphisms h1 ( ) and h1Inv ( ). In summary, the categorical mapping of a carefully incised subset of valuetype capabilities is both efficient and elegant.

Is to be understood that embodiments described herein include the generator 150 as a software application, or as part of another application, or as logic instructions and/or data encoded within a fixed or removable computer readable medium such as a floppy disk, hard disk or in an optical medium, or in a memory system such as in firmware, read only memory (ROM), or, as in the previous examples, as executable code within a memory system (e.g., within random access memory or RAM). It is also to be understood that other embodiments provide the generator 150 operating within a processor such as a central processing unit as a process. While not shown in this example, those skilled in the art will understand that a computer system can implement the generator and may include other processes and/or software and hardware components, such as an operating system, complier, etc. Thus embodiments of the invention include the generator program existing as either code in unexecuted form on a computer readable medium (e.g., as a software program on a transportable medium such as a CDROM) or as an executing software process or as a computer system configured to operate as explained herein.

Other alternative arrangements of the invention include rearranging the processing steps explained above in such a way that the overall effect of the invention is the same or an equivalent. It is to be thus understood by those skilled in the art that the particular arrangement of processing steps in many instances does not specify implementation of embodiments. As such, those skilled in the art of software development and computer-related technologies will understand that there can be many ways and orders of representing the processing operations explained above and such alternative embodiments of the software code will still achieve the overall effects, features and advantages of the invention as explained herein. In addition, embodiments of the invention are not limited to operation on the computer systems shown above. The generator can operate on shared computing resources, or can be distributed among any number of computer systems. Furthermore, embodiments of the invention may operate to map application code to middleware for use in a storage area network management application. Thus a storage area network application configured with valuetype mapping as explained herein is also considered an embodiment of the invention.

What is claimed is:

1. A method of categorical mapping of valuetypes, the method comprising:
   at a computer, receiving, as input, a valuetype within an object model specification;
   applying a categorical-based generator that applies at least one morphism to the object model specification, application of the categorical-based generator including:
   i) generating an interface that exposes the valuetype in an interface object model comprising:
      simulating, in the interface object model, a valuetype hierarchy for the valuetype in which a first valuetype inherits from a second valuetype;
   ii) generating an implementation of the interface that exposes the valuetype in a middleware implementation object model, wherein generating the implementation of the interface that exposes the valuetype in a middleware implementation object model comprises:
      providing a delegation scheme for the valuetype hierarchy for the valuetype in which the first valuetype inherits from the second valuetype by generating a class that implements the first valuetype, in the middleware implementation object model, the class delegating to middleware through a private member delegate, a type of the private member delegate extends a corresponding middleware valuetype, wherein the providing the delegation schema comprises:
         implementing the valuetype hierarchy through delegation within the class using a private strongly-typed morphism; and
         implementing the valuetype hierarchy through delegation throughout the interface object model using a weakly-typed morphism;
   wherein the applying a categorical-based generator that applies at least one morphism to the object model specification comprises:
   performing an application-level cast of an interface object model valuetype object using a plain Java-syntax cast; and
   applying an inverse morphism to create an instance of the middleware-implementation object model that corresponds to an actual type of a delegate.

2. The method of claim 1 wherein applying a categorical-based generator that applies at least one morphism to the object model specification comprises:
   performing categorical mapping of the valuetype so that a generated combination of the interface that exposes the valuetype in an interface object model and the implementation of the interface in a middleware implementation object model seamlessly support valuetype properties including inheritance, null values, native casting and arbitrary graph communication.

3. The method of claim 1 wherein applying a categorical-based generator that applies at least one morphism to the object model specification further comprises:
   defining the valuetype to delegate to a generated implementation class of that valuetype.

4. The method of claim 3 wherein the valuetype is an adequately restricted Interface Description Language (IDL) valuetype and wherein the interface exposing the valuetype in the interface object model is a Java interface; and
   wherein defining the valuetype to delegate to a generated implementation class of that valuetype comprises:
   identifying that a valuetype factory is unnecessary if an implementation class of an abstract class defining the valuetype resides in a same package as the abstract class and the implementation class follows a naming convention.

5. The method of claim 1 wherein applying a categorical-based generator that applies at least one morphism to the object model specification further comprises:
   invoking a null checking method that checks for a null value of the valuetype before applying the at least one morphism to a bridge instance to avoid overhead when handling null valuetypes.

6. The method of claim 1 wherein applying an inverse morphism to create an instance of the middleware-implementation object model that corresponds to an actual type of a delegate comprises:
   invoking a bridge creation method to obtain the type of the delegate;
   invoking a bridge synthesis method to synthesize, using a reflection technique, a corresponding bridge type in the middleware-implementation object model;
   constructing an instance of the corresponding bridge type, which wraps the delegate.

7. The method of claim 1 wherein applying a categorical-based generator that applies at least one morphism to the object model specification further comprises:

producing the interface that exposes the value type and the implementation of the interface that exposes the value-type that collectively allow communication of arbitrary graphs using recursive valuetypes.

8. The method of claim 1 further comprising:

during runtime, transmitting an arbitrary graph using recursive valuetypes, and during transmission, determining whether two nodes in a graph defined by the recursive valuetypes are identical using an equivalence method in the interface object model.

9. The method of claim 8 wherein transmitting an arbitrary graph using recursive valuetypes comprises:

verifying that two objects under comparison in the arbitrary graph are non null and of the same type, and if so, invoking an equivalence method that delegates to an equivalence operator on underlying valuetypes of the two objects in the arbitrary graph by applying the at least one morphism; and mapping each attribute of every valuetype on the inheritance hierarchy to public getter and setter methods to avoid copying overhead.

10. A computer system comprising:

a memory;

a processor;

an interconnection mechanism coupling the memory and the processor;

wherein the memory is encoded with a generator that when executed on the processor causes the computer system to perform categorical mapping of valuetypes by providing a process that executed in the processor that causes the processor to perform processing operations of:

receiving, as input, a valuetype within an object model specification;

applying a categorical-based generator that applies at least one morphism to the object model specification, application of the categorical-based generator including:

i) generating an interface that exposes the valuetype in an interface object model comprising:

simulating, in the interface object model, a valuetype hierarchy for the valuetype in which a first valuetype inherits from a second valuetype;

ii) generating an implementation of the interface that exposes the valuetype in a middleware implementation object model, wherein generating the implementation of the interface that exposes the valuetype in a middleware implementation object model comprises:

providing a delegation scheme for the valuetype hierarchy for the valuetype in which the first valuetype inherits from the second valuetype by generating a class that implements the first valuetype, in the middleware implementation object model, the class delegating to middleware through a private member delegate, a type of the private member delegate extends a corresponding middleware valuetype, wherein the providing the delegation schema comprises:

implementing the valuetype hierarchy through delegation within the class using a private strongly-typed morphism; and implementing the valuetype hierarchy through delegation throughout the interface object model using a weakly-typed morphism;

wherein the applying a categorical-based generator that applies at least one morphism to the object model specification comprises:

performing an application-level cast of an interface object model valuetype object using a plain Java-syntax cast; and applying an inverse morphism to create an instance of the middleware-implementation object model that corresponds to an actual type of a delegate.

11. The computer system of claim 10 wherein applying a categorical-based generator that applies at least one morphism to the object model specification comprises:

performing categorical mapping of the valuetype so that a generated combination of the interface that exposes the valuetype in an interface object model and the implementation of the interface in a middleware implementation object model seamlessly support valuetype properties including inheritance, null values, native casting and arbitrary graph communication.

12. The computer system of claim 10 wherein applying a categorical-based generator that applies at least one morphism to the object model specification further comprises:

defining the valuetype to delegate to a generated implementation class of that valuetype;

wherein the valuetype is an adequately restricted Interface Description Language (IDL) valuetype and wherein the interface exposing the valuetype in the interface object model is a Java interface; and wherein defining the valuetype to delegate to a generated implementation class of that valuetype comprises:

identifying that a valuetype factory is unnecessary if an implementation class of an abstract class defining the valuetype resides in a same package as the abstract class and the implementation class follows a naming convention.

13. The computer system of claim 10 wherein applying an inverse morphism to create an instance of the middleware-implementation object model that corresponds to the actual type of a delegate comprises:

invoking a bridge creation method to obtain the type of the delegate;

invoking a bridge synthesis method to synthesize, using a reflection technique, a corresponding bridge type in the middleware-implementation object model;

constructing an instance of the corresponding bridge type, which wraps the delegate.

14. The computer system of claim 10 further comprising:

during runtime, transmitting an arbitrary graph using recursive valuetypes, and during transmission, determining whether two nodes in a graph defined by the recursive valuetypes are identical using an equivalence method in the interface object model; and wherein transmitting an arbitrary graph using recursive valuetypes comprises:

verifying that two objects under comparison in the arbitrary graph are non null and of the same type, and if so, invoking an equivalence method that delegates to an equivalence operator on underlying valuetypes of the two objects in the arbitrary graph by applying the at least one morphism; and mapping each attribute of every valuetype on the inheritance hierarchy to public getter and setter methods to avoid copying overhead.

15. A computer readable storage medium encoded with processing logic that, when executed on a processor in a computer system provides a generator that causes the computer system to perform the operations of:

perform categorical mapping of valuetypes by providing a process that executed in the processor that causes the processor to perform processing operations of:

at a computer, receiving, as input, a valuetype within an object model specification;

applying a categorical-based generator that applies at least one morphism to the object model specification, application of the categorical-based generator including:

i) generating an interface that exposes the valuetype in an interface object model comprising:

simulating, in the interface object model, a valuetype hierarchy for the valuetype in which a first valuetype inherits from a second valuetype;

ii) generating an implementation of the interface that exposes the valuetype in a middleware implementation object model, wherein generating the implementation of the interface that exposes the valuetype in a middleware implementation object model comprises:

providing a delegation scheme for the valuetype hierarchy for the valuetype in which the first valuetype inherits from the second valuetype by generating a class that implements the first valuetype, in the middleware implementation object model, the class delegating to middleware through a private member delegate, a type of the private member delegate extends a corresponding middleware valuetype wherein the providing the delegation schema comprises:

implementing the valuetype hierarchy through delegation within the class using a private strongly-typed morphism; and implementing the valuetype hierarchy through delegation throughout the interface object model using a weakly-typed morphism;

wherein the applying a categorical-based generator that applies at least one morphism to the object model specification comprises:

performing an application-level cast of an interface object model valuetype object using a plain Java-syntax cast; and applying an inverse morphism to create an instance of the middleware-implementation object model that corresponds to an actual type of a delegate.

* * * * *